(12) United States Patent
Ban et al.

(10) Patent No.: US 7,502,504 B2
(45) Date of Patent: Mar. 10, 2009

(54) THREE-DIMENSIONAL VISUAL SENSOR

(75) Inventors: Kazunori Ban, Yamanashi (JP); Ichiro Kanno, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 802 days.

(21) Appl. No.: 10/685,498

(22) Filed: Oct. 16, 2003

(65) Prior Publication Data
US 2004/0081352 A1 Apr. 29, 2004

(30) Foreign Application Priority Data
Oct. 17, 2002 (JP) .............................. 2002-302559

(51) Int. Cl.
*G06K 9/00* (2006.01)
(52) U.S. Cl. .................................... 382/152
(58) Field of Classification Search ................ 382/106, 382/287, 285, 154, 152, 143–147, 151–153, 382/142, 209, 217
See application file for complete search history.

(56) References Cited

U.S. PATENT DOCUMENTS

| | | | | | |
|---|---|---|---|---|---|
| 4,616,121 A | * | 10/1986 | Clocksin et al. | ........ | 219/124.34 |
| 4,879,664 A | * | 11/1989 | Suyama et al. | ............. | 700/186 |
| 4,961,155 A | | 10/1990 | Ozeki et al. | | |
| 4,985,846 A | | 1/1991 | Fallon | | |
| 5,102,223 A | * | 4/1992 | Uesugi et al. | ............... | 356/607 |
| 5,198,876 A | * | 3/1993 | Anezaki et al. | ............. | 382/106 |
| 5,305,092 A | * | 4/1994 | Mimura et al. | ............... | 356/609 |
| 5,396,331 A | * | 3/1995 | Kitoh et al. | ................. | 356/611 |
| 5,416,591 A | | 5/1995 | Yoshimura et al. | | |
| 5,644,141 A | * | 7/1997 | Hooker et al. | .......... | 250/559.22 |
| 5,987,591 A | * | 11/1999 | Jyumonji | .................... | 700/259 |
| 6,064,747 A | * | 5/2000 | Wills et al. | .................. | 382/100 |

FOREIGN PATENT DOCUMENTS

| | | |
|---|---|---|
| EP | 1 190 818 A2 | 3/2002 |
| JP | 60-183509 | 9/1985 |
| JP | 60-218166 | 10/1985 |
| JP | 63-044103 | 2/1988 |
| JP | 5-045117 | 2/1993 |
| JP | 6-147830 | 5/1994 |
| JP | 6-229720 | 8/1994 |
| JP | 2562047 | 9/1996 |

OTHER PUBLICATIONS

Christensen, S.S., et al. (1996). *Visual guidance of a pig evisceration robot using neural networks.* Pattern Recognition Letters, 17, 345-355.

(Continued)

*Primary Examiner*—Matthew C Bella
*Assistant Examiner*—Dennis Rosario
(74) *Attorney, Agent, or Firm*—Staas & Halsey LLP

(57) ABSTRACT

A three-dimensional visual sensor which measures the three-dimensional position and orientation of an objective workpiece accurately even when the position and orientation thereof varies. The position Ca, tilting angle θa and size S of a first region A which includes a characteristic part of an objective workpiece, and the position Cb and radius Rb of a second region B which is a target region of measurement are determined in a two-dimensional image of a representative objective workpiece captured from a predetermined position, and stored as reference information. An image of a to-be-measured objective workpiece is captured, and in the image, a region corresponding to the second region is determined on the basis of the position C'a, tilting angle θ'a and size S' of a region corresponding to the first region A, and the reference information. The position and orientation of the objective workpiece is obtained by measuring the region determined as corresponding to the second region.

20 Claims, 6 Drawing Sheets

OTHER PUBLICATIONS

Partial European Search Report issued Apr. 11, 2007 in corresponding European Patent Application No. 03256492.4-2213.
European Search Report issued Jun. 29, 2007 in corresponding European Patent Application No. 03256492.4-2213.
Notification of Grounds for Rejection dated Nov. 2, 2004.

Japanese Office Action issued in priority Japanese Application No. 2002-302559 presents rejections based on JP 6-229720 (Reference: AG); JP 5-045117 (Reference: AH); JP 6-147830 (Reference: AI); JP 63-044103 (Reference: AJ); JP 60-218166 (Reference: AK) and 2562047 (Reference: AL) in Form PTO-1449 hereof.

* cited by examiner

THREE-DIMENSIONAL VISUAL SENSOR

BACKGROUND OF THE INVENTION

1. Field of the Invention

The present invention relates to a three-dimensional visual sensor for measuring position and orientation of an objective workpiece by projecting a reference beam such as a laser beam onto the objective workpiece and receiving a reflected beam with a camera.

2. Description of Related Art

The three-dimensional visual sensor for measuring the position and orientation of an objective workpiece by projecting a reference beam such as a laser beam onto the objective workpiece and receiving the reflected beam with a camera is used broadly and generally. Regarding the reference beam, various types such as a spot beam and a slit beam are known. Also regarding the beam projecting means, various types such as a type having two light sources and a type which scans an objective workpiece with a single light source and thereby produces effects equivalent to the effects produced by the type having a plurality of light sources are known.

Also, a visual system which detects the three-dimensional position of an outline of an object using an image capturing device for capturing a two-dimensional image and a three-dimensional position measuring device using a slit laser beam is known (for example, JP 60-183509 A).

In the case in which an objective workpiece placed at a predetermined position is measured with a three-dimensional visual sensor to obtain data on the shape of the objective workpiece or examine the objective workpiece, a reference beam such as a laser beam from the three-dimensional visual sensor can always be projected onto the objective workpiece and required data can always be obtained. However, in the case of an objective workpiece of which the position and/or orientation on a plane is not settled, or an objective workpiece of which the three-dimensional position and orientation are not settled like workpieces stacked randomly, when the position and orientation of the objective workpiece is measured with the three-dimensional visual sensor, it cannot be determined which part of the objective workpiece the reference beam is projected on, or even whether the reference beam falls on the objective workpiece or not. Thus, the position and orientation of the three-dimensional visual sensor needs to be adjusted so that the reference beam will be projected on an intended part. However, there is no three-dimensional visual sensor which can perform automatic adjustment, which forms an obstacle to automation of work.

SUMMARY OF THE INVENTION

The invention provides a three-dimensional visual sensor which can automatically measure an objective workpiece to obtain required data even when the position and/or orientation of the objective workpiece varies.

A three-dimensional visual sensor according to the invention obtains three-dimensional information on an objective workpiece from an image of the objective workpiece which is captured by projecting a reference beam onto the objective workpiece. In order to measure the three-dimensional position or the three-dimensional position and orientation of an objective workpiece accurately, the three-dimensional visual sensor comprises means for storing, as reference information, information on a first region which includes a characteristic part of the objective workpiece and a second region which is a target region of three-dimensional measurement (information on a position of the first region and a position of the second region, or information on a positional relation between the first and second regions and the range of the second region), the information on the first and second regions being obtained from a two-dimensional image of a reference workpiece of the same type as the objective workpiece captured from a predetermined position; means for capturing an image of the objective workpiece and determining a region corresponding to the first region in the picture of the objective workpiece; means for determining a region corresponding to the second region based on information on the position of the region determined as corresponding to the first region and the reference information stored in advance; and means for obtaining three-dimensional information on the objective workpiece in the region determined as corresponding to the second region in an image of the objective workpiece which is captured by projecting the reference beam onto the objective workpiece.

The reference information may be information on a position and an orientation of the first region and a position and a range of the second region, or alternatively, information on a positional relation between the first and second regions, an orientation of the first region and a range of the second region. In this case, a region corresponding to the second region is determined, based on information on the position and orientation of the region which has been determined as corresponding to the first region in the image of the objective workpiece and the reference information stored in advance, so that the three-dimensional position or orientation of the objective workpiece can be measured accurately even when the position and orientation of the objective workpiece varies.

The reference information may be information on a position and a size of the first region and a position and a range of the second region, or alternatively, information on a positional relation between the first and second regions, a size of the first region and a range of the second region. In this case, a region corresponding to the second region is determined based on information on the position and size of the region which has been determined as corresponding to the first region in the image of the objective workpiece and the reference information stored in advance, so that the three-dimensional position of the objective workpiece can be measured accurately even when the distance of the objective workpiece from the three-dimensional visual sensor varies.

The reference information may be information on a position, a size and an orientation of the first region and a position and a range of the second region, or alternatively, information on a positional relation between the first and second regions, a size and an orientation of the first region and a range of the second region. In this case, a region corresponding to the second region is determined based on information on the position, size and orientation of the region which has been determined as corresponding to the first region in the picture of the objective workpiece and the reference information stored in advance, so that the three-dimensional position and orientation of the objective workpiece can be measured accurately even when the distance of the objective workpiece from the three-dimensional visual sensor, and the position and orientation of the objective workpiece vary.

It may be so arranged that the two-dimensional image from which the information on the first region is obtained is a two-dimensional image captured without projecting the reference beam, while the two-dimensional image from which the information on the second region is obtained is a two-dimensional image captured by projecting the reference beam. Alternatively, it may be so arranged that the two-dimensional image from which the information on the first and second regions is obtained is a two-dimensional image captured by projecting the reference beam.

In order to measure the three-dimensional position and orientation of an objective workpiece accurately, another three-dimensional visual sensor according to the invention comprises means for predetermining a region for obtaining three-dimensional information on an objective workpiece in a captured image of a reference workpiece of the same type as the objective workpiece; means for determining a position, or a position and a size, or a position, a size and an orientation of a region corresponding to the predetermined region in an image of the objective workpiece which is captured by projecting the reference beam onto the objective workpiece, based on predetermined information on the objective workpiece; and means for obtaining three-dimensional information on the objective workpiece from the determined region.

The predetermined information may be information obtained from measurement of a height of the objective workpiece. In the case, the three-dimensional visual sensor may be attached to a robot, and the predetermined information may be information on a positional relation between the objective workpiece and the robot obtained based on the position of the robot. The predetermined information may be information supplied externally.

DETAILED DESCRIPTION

Figure 1:
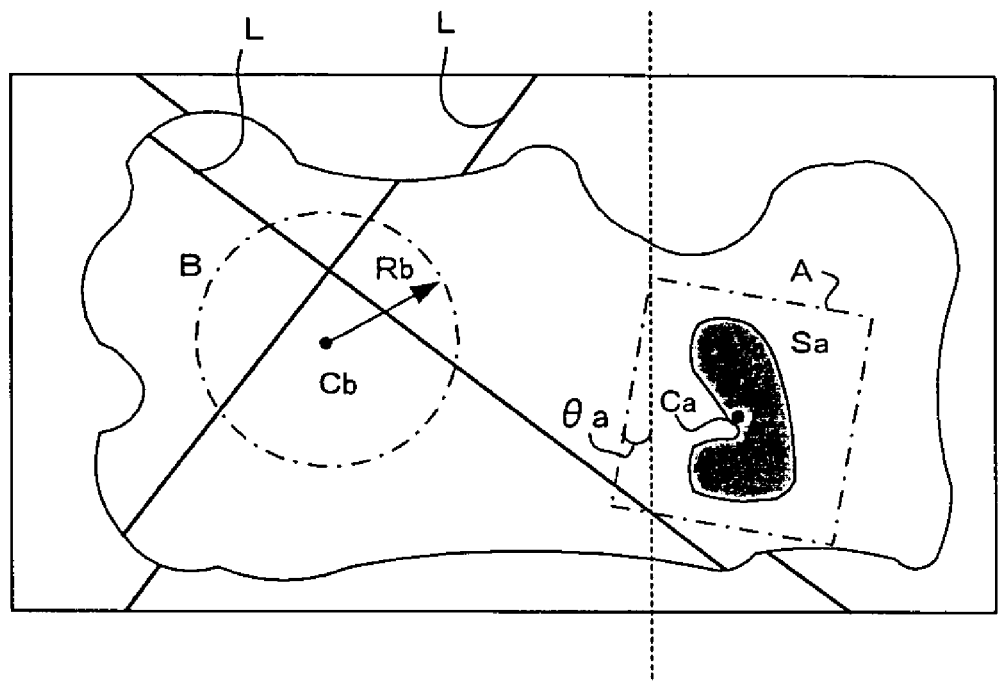
FIG. 1 is an illustration for explaining principles of a first embodiment of the invention, specifically, explaining how to obtain reference data from an image captured of an objective workpiece.
Figure 2:
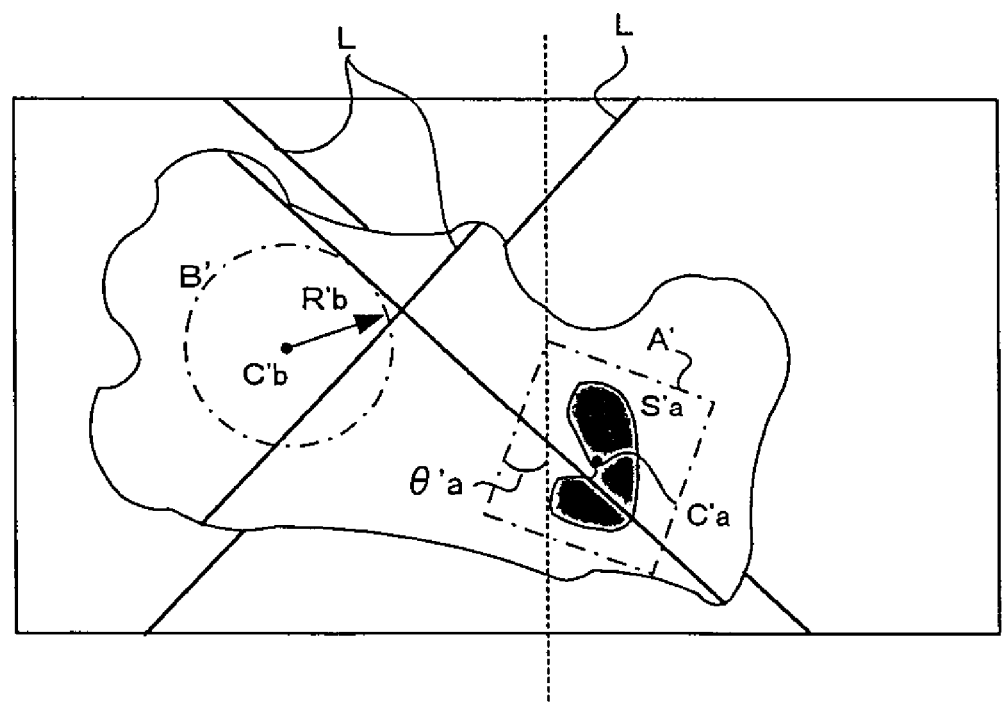
FIG. 2 is a an illustration for explaining principles of the first embodiment, specifically, explaining variation of the position and orientation of an objective workpiece in an image thereof.

FIGS. 1 and 2 are illustrations for explaining principles of a first embodiment of the invention. FIG. 1 shows an image of a reference workpiece captured by a camera, the reference workpiece having the same shape and size as one of objective workpieces which are objects of operation. A region A is set as a region where a characteristic part of the workpiece (i.e. the reference workpiece of the same type as the objective workpieces) has been detected through two-dimensional image processing. A center position Ca (xa, ya), a tilting angle θa and a size Sa of the region A which includes the characteristic part are detected.

A region B is set as a region which has been determined as a target region of three-dimensional measurement on the captured image. In the present example, the target region B of three-dimensional measurement is a circle in shape. The center position Cb (xa, ya) of the region B, and the radius Rb of the region B which determines the range of the region B are determined.

The regions A and B are on the same workpiece. Hence, the relation between the regions A and B is constant on objective workpieces of the same type. Specifically, the distance between the center positions Ca, Cb, namely $\{(xb-xa)^2+(yb-ya)^2\}^{1/2}$ is constant on objective workpieces of the same type.

The center position Ca (xa, ya), the tilting angle θa and the size Sa of the reference region A which includes the characteristic part, and the center position Cb (xb, yb) of the region B and the radius Rb of the region B which determines the range of the region B are determined this way and stored as reference information. Alternatively, the center position Ca (xa, ya), the tilting angle θa and the size Sa of the region A, the relation between the regions A and B, namely (xb−xa) and (yb−ya), and the radius Rb of the region B are determined and stored as reference information.

Even when the position from which the three-dimensional visual sensor (camera) performs measurement is the same, the position at which a reference beam projected from the three-dimensional visual sensor falls on a to-be-measured objective workpiece varies as the position or orientation of the objective workpiece varies. Unless data on the target region of measurement by the three-dimensional visual sensor (camera) is re-determined depending on this variation, the intended target region B on the objective workpiece cannot be measured.

Hence, in the present invention, data on the target region of measurement is automatically determined so that the intended target region B on the objective workpiece can always be measured even when the position or orientation of the objective workpiece varies.

FIG. 2 shows an image of an objective workpiece which is an object of operation, captured by the camera of the three-dimensional visual sensor. A region A' is a region where the characteristic part of the workpiece has been detected through two-dimensional image processing. Suppose that the center position, the tilting angle and the size of the detected region A' are C'a (x'a, y'a), θ'a, and S'a, respectively. By calculating the following equations (1) to (3) on the basis of this data and the stored data, the center position C'b (x'b, y'b) and the radius R'b of a region B' which corresponds to the intended target region B on the objective workpiece are obtained:

$$x'b=(S'a/Sa)\{(xb-xa)\cos(\theta'a-\theta a)-(yb-ya)\sin(\theta'a-\theta a)\}+x'a \quad (1)$$

$$y'b=(S'a/Sa)\{(xb-xa)\sin(\theta'a-\theta a)+(yb-ya)\cos(\theta'a-\theta a)\}+y'a \quad (2)$$

$$R'b=(S'a/Sa)Rb \quad (3)$$

When the region B' of which the center position C'b (x'b, y'b) and the radius R'b have been obtained this way is measured as a target region of three-dimensional measurement, this means that the target region B on the objective workpiece is measured. Hence, the three-dimensional position and orientation of the objective workpiece can be measured accurately.

Specifically, even when the objective workpiece is at a position different from the reference position on the plane (XY plane) which is perpendicular to the optical axis of the camera, or the objective workpiece has turned and has an orientation different from the reference orientation, the target region B' of three-dimensional measurement can be determined using the equations (1) and (2). Further, even when the distance between the camera and the objective workpiece is different from the reference distance, the radius R'b which determines the range of the target region of three-dimensional measurement is determined using the equation (3) to replace the radius Rb, and the position of the target region of three-dimensional measurement on the plane is determined using the equations (1) and (2). Hence, the intended target region of three-dimensional measurement (B=B') can be determined and measured.

Figure 3:
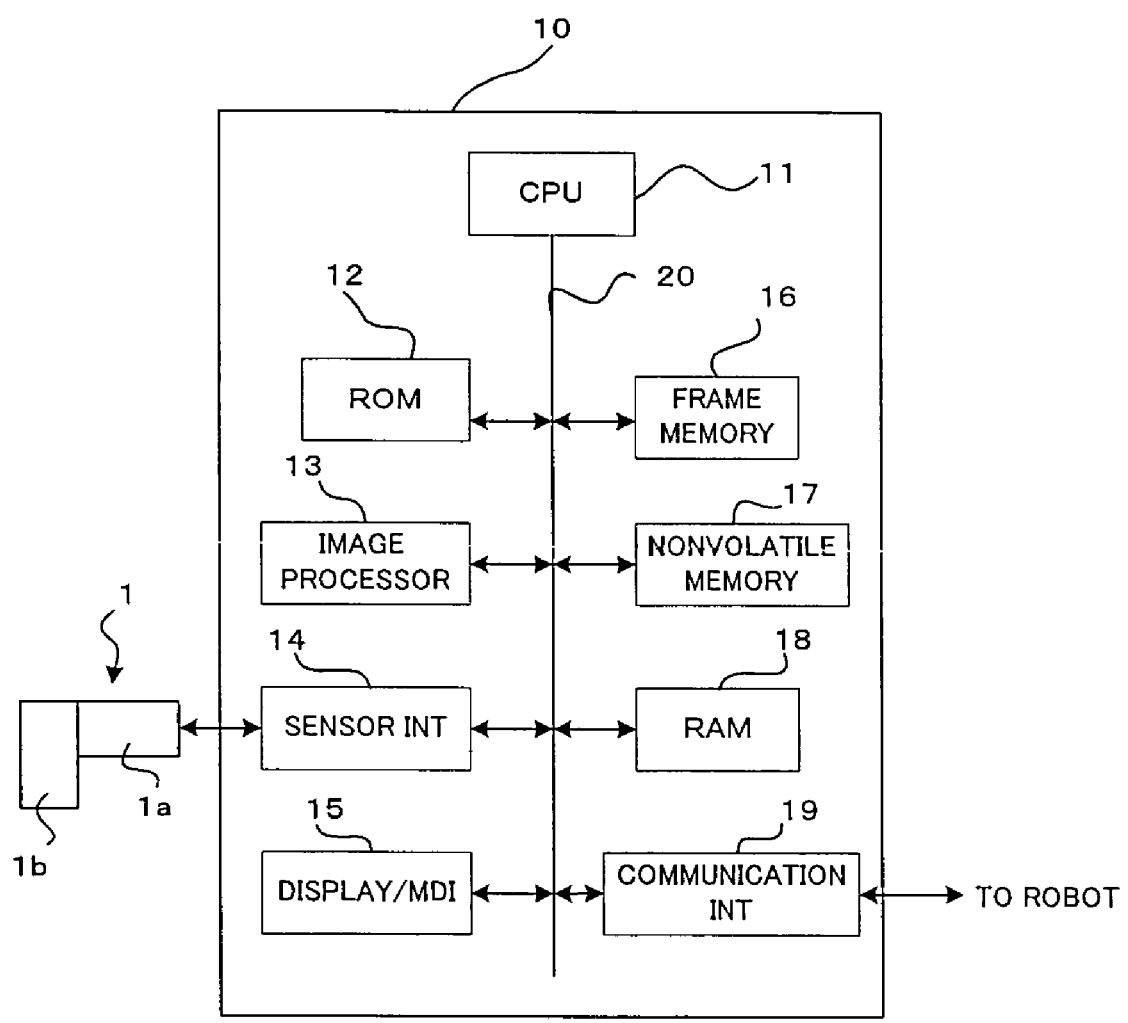
FIG. 3 is a block diagram showing a three-dimensional visual sensor according to an embodiment of the invention.

FIG. 3 is a block diagram showing relevant parts of a three-dimensional visual sensor according to the present embodiment of the invention. In FIG. 3, reference numeral 1 denotes a sensor section of the three-dimensional visual sensor, which comprises a laser slit beam projector 1a for projecting a slit beam as a reference beam, and a camera 1b for receiving a beam projected from the laser slit beam projector 1a and reflected by an objective workpiece. Reference numeral 10 denotes an image processing section for controlling the sensor section 1 and analyzing an image captured by the camera 1b.

The image processing section 10 comprises a processor 11, ROM 12 which is connected to the processor 11 by a bus 20 and in which system programs are stored, an image processor 13, a sensor interface 14 connected to the sensor section 1, an MDI device 15 with a display device, frame memory 16, nonvolatile memory 17 (RAM or the like backed up by batteries) in which various application programs and determined values are stored, RAM 18 used for temporarily storing data, or used in operation and the like, a communication interface 19 for communicating with a robot or the like to which the three-dimensional visual sensor is attached, and the like.

An image captured with a beam projected from the laser slit beam projector 1a and reflected is converted to a gray-scale light-and-shade image and stored in the frame memory 16. The image processor 13 analyzes and processes image data stored in the frame memory, according to a control signal sent from the processor 11 according to programs.

The above-described structure of the three-dimensional visual sensor is the same as a conventional structure. The difference is that programs for the process shown in FIG. 4 (described later) are stored in the nonvolatile memory 17.

First, a reference workpiece is chosen among objective workpieces which are objects of operation, as a representative thereof, and on the basis of the reference workpiece, reference data is obtained.

First, an image of the workpiece is captured by the camera 1b without projecting the laser slit beam as the reference beam from a predetermined position. The image stored in the frame memory 16 is displayed on the display device of the display/MDI device 15, a region A which includes a characteristic part of the workpiece is determined as a reference region, and a center position Ca (xa, ya) of the region A, a tilting angle θa of the region A, and a size Sa such as a length or an area of the region A which is an index of the size of the characteristic part are determined by the image processor 13 and stored in the nonvolatile memory 17.

Next, keeping the positional relation between the three-dimensional visual sensor 1 and the representative objective workpiece (reference workpiece) unchanged, an image of the workpiece is captured with a laser slit beam projected form a predetermined position. The captured image is displayed on the display of the display/MDI device 15, a target region B of three-dimensional measurement on the workpiece is determined, and data on the determined target region B are stored. In the present embodiment, the target region B of three-dimensional measurement is a circle in shape, and the center position Cb (xb, yb) and the radius Rb of the region B which determines the range of the region B are determined and stored in the nonvolatile memory 17.

As long as a clear two-dimensional image can be captured, the regions A and B may be determined at the same time, not projecting or projecting a laser slit beam.

As mentioned above, the required information comprises positional relation information (xb−xa), (yb−ya), namely information on the positional relation between the center position Ca (xa, ya) of the region A and the center position Cb (xb, yb) of the region B, the size Sa of the region A, the tilting angle θa of the region A, and the range (radius Rb) of the region B. Hence, only the information (xb−xa), (yb−ya), Sa, θa, Rb needs to be stored.

Figure 4:
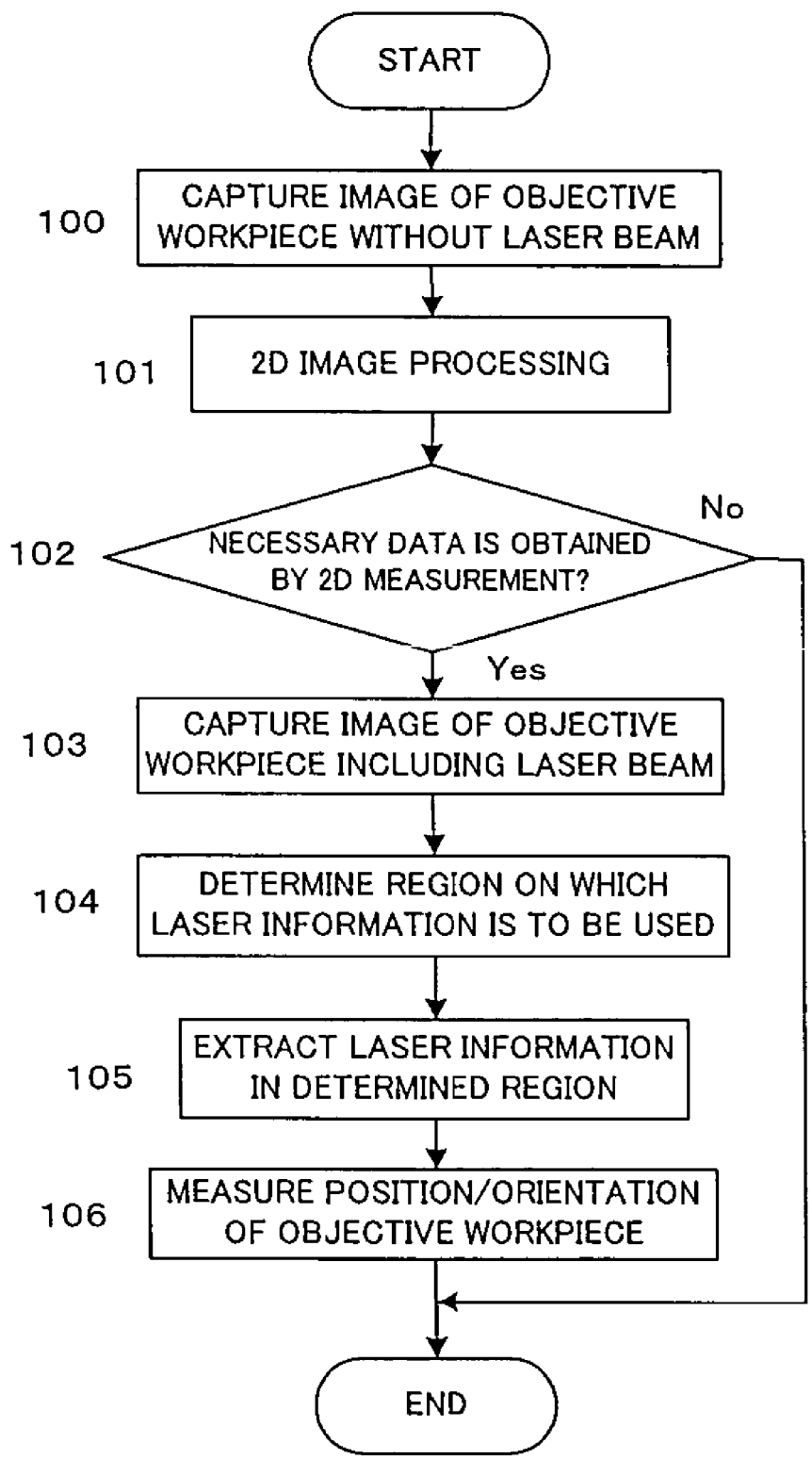
FIG. 4 is a flow chart showing an operation process according to the first embodiment of the invention.

After the data for determining a target region of three-dimensional measurement is stored this way, work is started, where the processor 11 of the three-dimensional visual sensor performs the process shown in FIG. 4 to thereby obtain the three-dimensional position and orientation of an objective workpiece.

First, an image of an objective workpiece is captured without projecting a laser slit beam (Step 100). The image processor 13 performs two-dimensional image processing on the captured image and obtains the center position C'a (x'a, y'a), the tilting angle θ'a and the size S'a of a region A' which includes the characteristic part of the objective workpiece (Step 101).

It is determined whether or not the above data on the objective workpiece has been obtained (Step 102). If the data has not been obtained, the procedure is terminated. If the data has been obtained, the procedure proceeds to Step 103 where an image of the workpiece is captured by the camera 1b with a laser slit beam L projecting from the laser slit beam projector 1a so that the captured image includes an image of the laser beam (Step 103).

Next, on the basis of the center position C'a (x'a, y'a), the tilting angle θ'a and the size S'a of the region A' which have been obtained at Step 101, and the center position Ca (xa, ya), the tilting angle θa and the size Sa of the reference region A and the center position Cb (xb, yb) and the radius Rb of the target region B of three-dimensional measurement which have been determined in advance and stored, the center position C'b (x'b, y'b) and the radius R'b of a target region B' of three-dimensional measurement are obtained (Step 104). Then, from the image obtained at Step 103, information on the target region B' of three-dimensional measurement (of which the center position is C'b (x'b, y'b) and the radius is R'b) is extracted, and using only the extracted information, the three-dimensional position and orientation of the objective workpiece is measured (Steps 105 and 106).

Hence, even when an objective workpiece is at a position different from the reference position or has an orientation different from the reference orientation, a target region of three-dimensional measurement is determined accurately, so that the three-dimensional position and orientation of the objective workpiece can be detected accurately.

In the above description of the first embodiment, the explanation has been made supposing that both the position and the orientation of an objective workpiece vary three-dimensionally. If an objective workpiece only moves on the plane (XY plane) perpendicular to the optical axis of the camera and the orientation of the objective workpiece does not vary, S'a/Sa=1 and θ'a−θa=0 in the above equations (1) to (3). Hence, the information which needs to be stored in advance, or the information used is only the data about the positional relation between the regions A and B, namely (xb−xa) and (yb−ya). Operation for determining the region B' is as follows:

$$x'b = (xb-xa) + x'a$$

$$y'b = (yb-ya) + y'a$$

$$R'b = Rb$$

If an objective workpiece is supposed to move and turn on the XY plane, the data used, or the data which needs to be stored is only the data about the positional relation between the regions A and B, namely (xb−xa) and (yb−ya), and the tilting angle θa. By performing operation with S'a/Sa=1 in the equations (1) to (3), the intended target region of three-dimensional measurement (B=B') can be determined.

In the above-described first embodiment, a characteristic part of an objective workpiece is detected through two-dimensional image processing, and on the basis of the detected characteristic part, a target region of three-dimensional measurement (B=B') is determined and measured. However, this is difficult to apply to an objective workpiece which does not have a two-dimensional characteristic. In this case, if an objective workpiece includes a relatively extensive part which differs little in height from a target region of three-dimensional measurement, results equivalent to the results in the first embodiment can be obtained by using information on the distance (height) between the objective workpiece and the sensor section.

Figure 5:
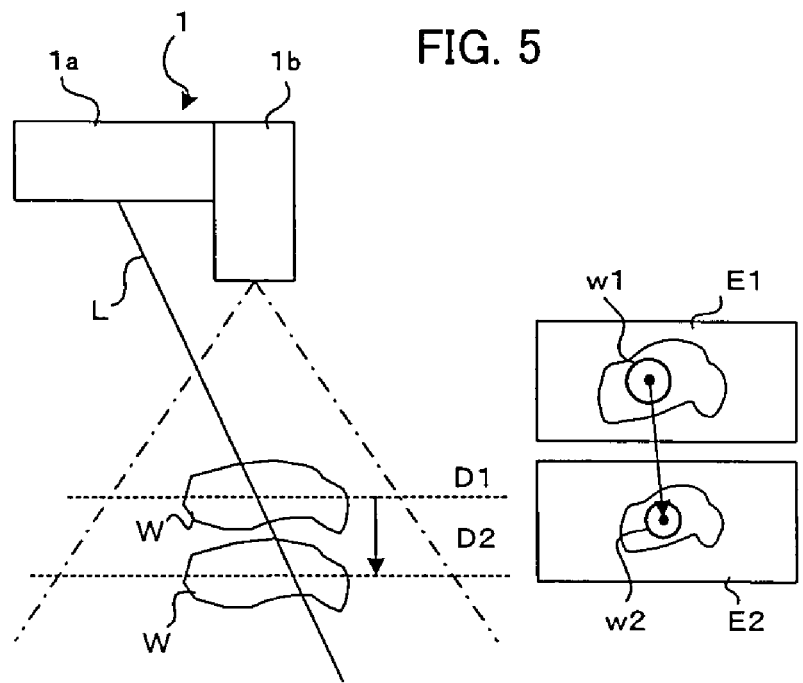
FIG. 5 is an illustration for explaining how an image of an objective workpiece varies as the distance between the objective workpiece and a three-dimensional visual sensor varies, in a second embodiment of the invention.

FIG. 5 is an illustration for explaining a second embodiment in which the three-dimensional position and orientation of an objective workpiece is measured using information on the distance (height) between the objective workpiece and the sensor section. Suppose that an objective workpiece W is at a short distance D1 from the sensor section 1, and that an image w1 of the objective workpiece is obtained in a picture frame E1 of a camera 1b by projecting a predetermined laser slit beam L from a laser slit beam projector 1a. As shown in FIG. 5, the image w1 of the objective workpiece on which the laser slit beam is projected is at a fixed position in the picture frame E1 which corresponds to the visual field of the camera. Suppose that an objective workpiece W is at a distance D2 from the sensor section 1, and that an image w2 of the objective workpiece W is obtained, projecting the predetermined laser slit beam L likewise. As shown in FIG. 5, the image w2 of the objective workpiece is found to the right in a picture frame E2 which corresponds to the visual field of the camera, as compared with the image w1.

To sum up, there is a fixed relation between the distance of an objective workpiece W from the sensor section 1 and the position of the image (w1, w2) of the objective workpiece W in the picture frame captured by the sensor section 1. Hence, by means of calibration, the relation between the position of an image of an objective workpiece in the picture frame captured by the camera and the distance of the objective workpiece from the sensor section is determined in advance. Further, a target region of three-dimensional measurement is determined in advance using the display/MDI device 15. Data on the determined relation and target region of three-dimensional measurement is stored in the nonvolatile memory 17 of the image processing section 10 of the three-dimensional visual sensor.

Figure 6:
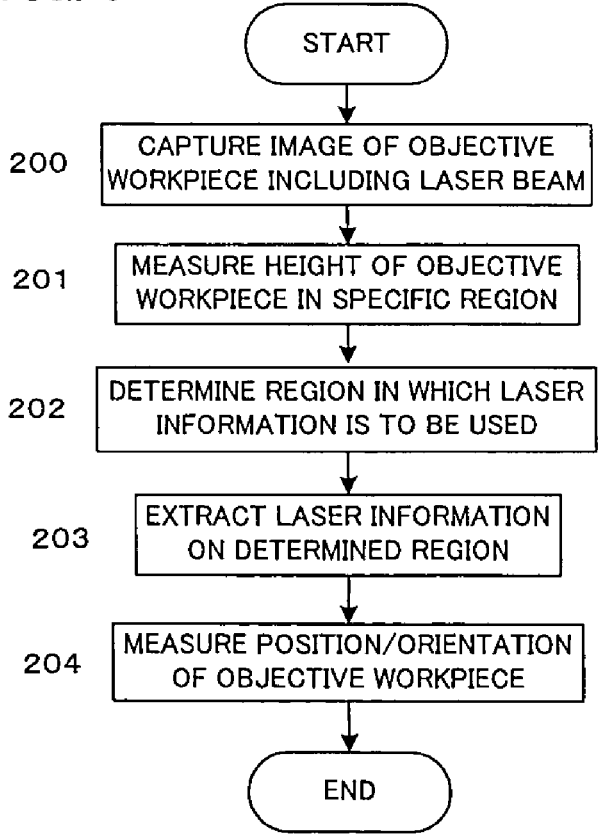
FIG. 6 is a flow chart showing an operation process according to the second embodiment of the invention.

When the three-dimensional position and orientation of an objective workpiece is measured, the processor 11 of the image processing section 10 performs the process shown in FIG. 6.

A laser slit beam is projected onto an objective workpiece from the laser slit beam projector 1a so that an image including the laser beam is captured by the camera 1b (Step 200). The distance (height) between the objective workpiece and the sensor section is determined by obtaining an average height of a specific region of a predetermined width, which is a region where it is inferred that the laser slit beam falls on the objective workpiece (Step 201). On the basis of the obtained distance (height) and calibration data, a target region of three-dimensional measurement in the image is determined (Step 202).

From the determined target region of three-dimensional measurement, laser information is extracted (Step 203). Using only the extracted information, the three-dimensional position and orientation of the objective workpiece is obtained (Step 204).

Figure 7A:
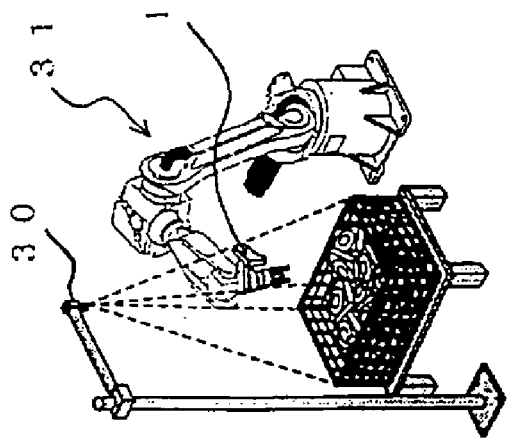
FIGS. 7a to 7c and FIGS. 7a' to 7c' are illustrations for explaining a third embodiment of the invention.
Figure 7B:
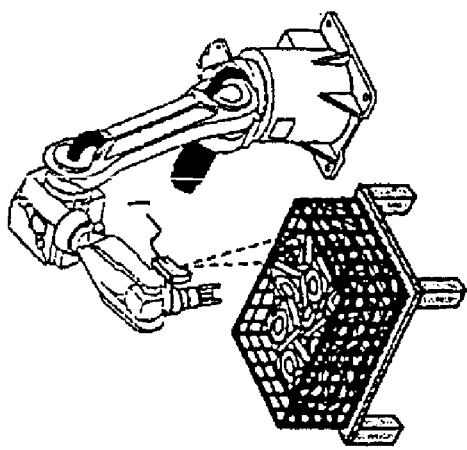
Figure 7C:
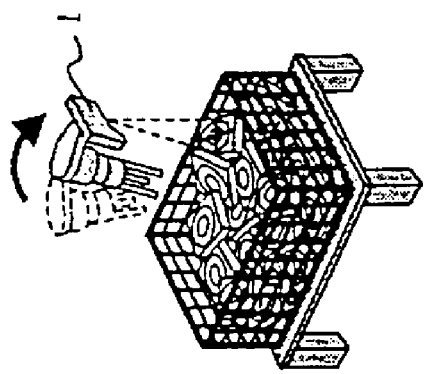
Figure 7A:
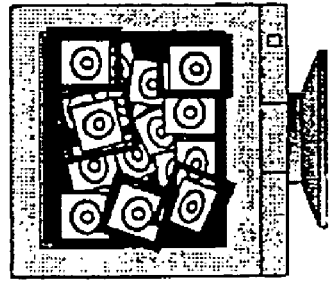
Figure 7B:
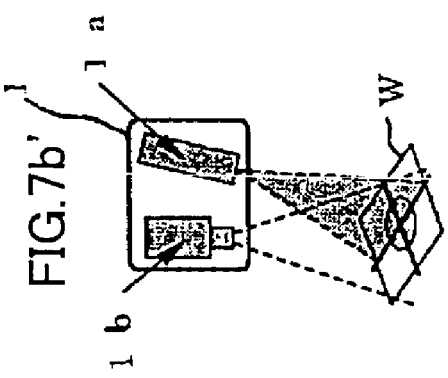
Figure 7C:
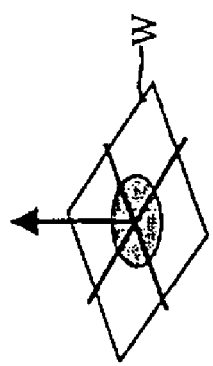
Figure 8:
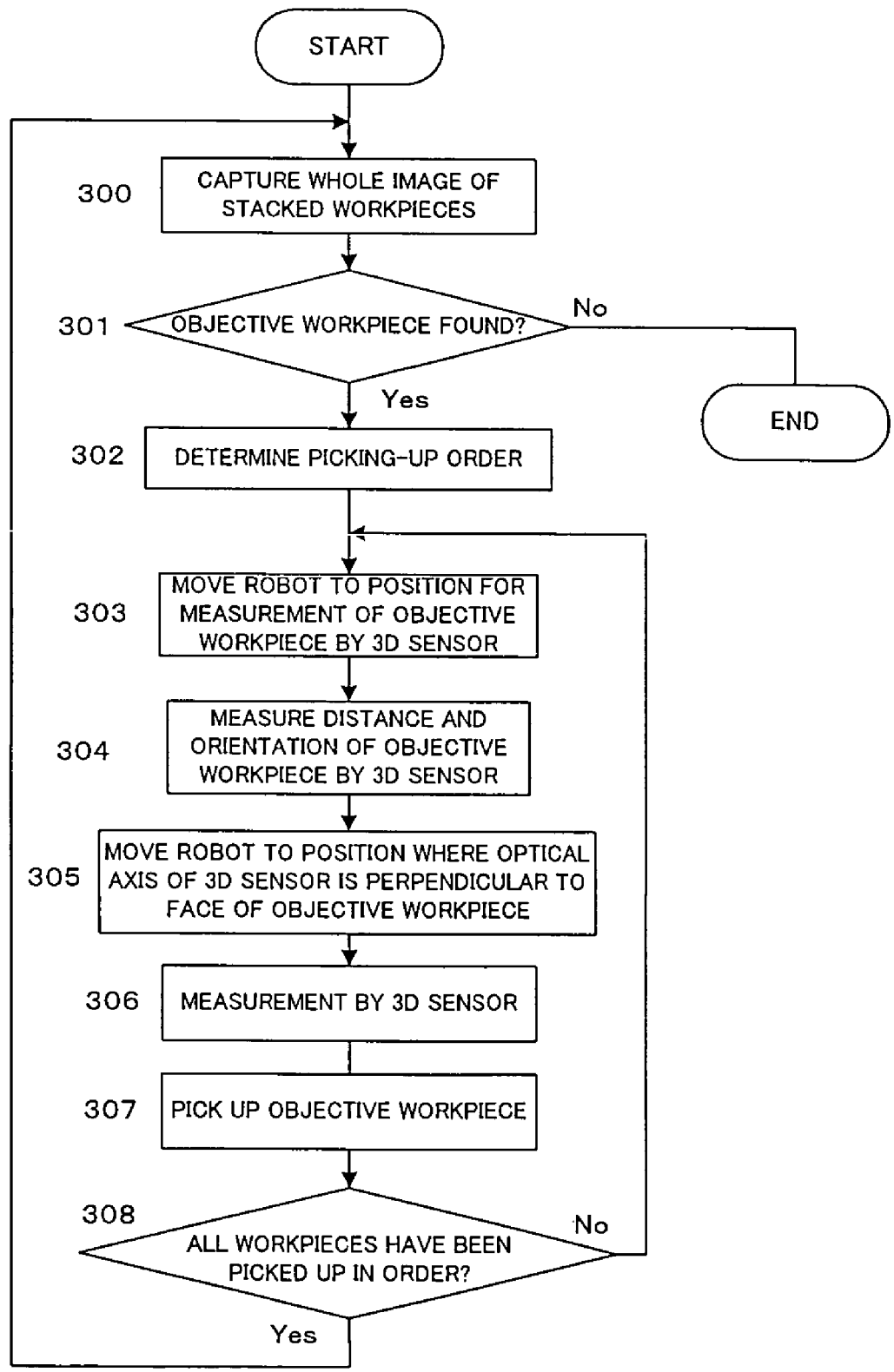
FIG. 8 is a flow chart showing an operation process according to the third embodiment of the invention.

FIGS. 7a to 7c and FIGS. 7a' to 7c' are illustrations for explaining a third embodiment of the invention, and FIG. 8 is a flow chart showing an operation process according to the third embodiment of the invention. In this embodiment, besides the three-dimensional visual sensor, another camera 30 is provided. Also, an image processing section for processing an image captured by the camera 30 is provided. It may be so arranged that this image processing section and a controller of a robot are connected by means of communication. However, in the present embodiment, the camera 30 is connected to the three-dimensional visual sensor. Specifically, a camera interface is provided in the image processing section 10 of the three-dimensional visual sensor shown in FIG. 3, and the camera 30 is connected by means of the camera interface.

As shown in FIG. 7a, the camera 30 is arranged at a position where the camera 30 can take an image of a whole image objective workpieces stacked randomly. The sensor section 1 of the three-dimensional visual sensor is attached to an arm-end wrist of a robot 31.

First, an image of a representative workpiece chosen from objective workpieces is captured by the three-dimensional visual sensor. Here, the representative workpiece is of the same type as the other objective workpieces. The image is displayed on the screen of the display/MDI device 15, a target region of three-dimensional measurement on the objective workpiece is determined using the MDI device, and data on the determined target region is stored in the nonvolatile memory 17 in advance.

A whole image of objective workpieces W stacked randomly is captured by the camera 30 (Step 300). Here, as shown in FIG. 7a', a two-dimensional image of the objective workpieces W stacked randomly is obtained. The processor 11 of the image processing section 10 determines whether or not at least one objective workpiece W is found in the captured image (Step 301). If no objective workpiece W is found, the process is terminated. If at least one objective workpiece is found, an objective workpiece of which full image is found is chosen and the order in which those objective workpieces is to be picked up is determined. Also, the positions of those objective workpieces in the image are converted to positions in the robot coordinate system, and supplied to the controller of the robot according to the determined order (Step 302). As shown in FIG. 7b, the controller of the robot moves the robot to a position where an image of the objective workpiece W can be captured by the three-dimensional sensor based on the supplied position in the robot coordinate system (Step 303). Then, as shown in FIG. 7b', the three-dimensional position of the objective workpiece is measured, projecting a laser slit beam from the laser slit beam projector 1a of the three-dimensional visual sensor (Step 304). In this measurement, the three-dimensional position and orientation of the objective workpiece is approximately determined. From the three-dimensional visual sensor, the obtained three-dimensional position and orientation information is sent to the controller of the robot. On the basis of this information, the controller of the robot moves the robot so that the three-dimensional visual sensor will face a predetermined face of the objective workpiece, or more specifically, the optical axis of the camera will cross the predetermined face of the objective workpiece at right angles, as shown in FIGS. 7c and 7c'(Step 305).

Next, the three-dimensional sensor measures a predetermined target region of three-dimensional measurement on the objective workpiece W, projecting a laser slit beam, to thereby obtain the accurate position and orientation of the objective workpiece (Step 306). Then, on the basis of the obtained position and orientation of the objective workpiece, the robot is driven to pick up the objective workpiece W (Step 307). Then, whether all the objective workpieces W of which the order was determined at Step 302 have been picked up or not is determined (Step 308). If all the objective workpieces of which the order was determined have not been picked up, the process returns to Step 303 to repeat the above-described process.

If all the objective workpieces W of which the order was determined have been picked up, the process returns to Step 300, where a whole image of the objective workpieces W stacked randomly is captured by the camera 30, and then the above-described process is repeated.

In the present invention, from information obtained by projecting a reference beam from the three-dimensional visual sensor, only information on an intended region of an objective workpiece is extracted, and the three-dimensional position and orientation of the objective workpiece is measured on the basis of the extracted information. Hence, the positional relation between the three-dimensional visual sensor and an objective workpiece does not need to be fixed, and accurate three-dimensional measurement can be performed.

What is claimed is:

1. A three-dimensional visual sensor for obtaining three-dimensional information on an objective workpiece based on an image of the objective workpiece captured by projecting a reference beam onto the objective workpiece, comprising:
   means for detecting a two-dimensional image of a reference workpiece of a same type as the objective workpiece;
   means for storing, as reference information, information about a surface of a first region including a characteristic part of the objective workpiece and a surface of a second region as a target region of three-dimensional measurement of the objective workpiece, said information about the first and second regions being obtained from the detected two-dimensional image of the reference workpiece of the same type as the objective workpiece, which is captured from a predetermined position;
   means for capturing an image of the objective workpiece and determining a region corresponding to said first region in the image of the objective workpiece;
   means for determining another region in the image of the objective workpiece corresponding to said second region based on information on a position of the region determined as corresponding to said first region and said reference information stored in said storage means; and
   means for obtaining three-dimensional information on the objective workpiece in the another region.

2. A three-dimensional visual sensor according to claim 1, wherein said reference information includes information on a position of said first region and a position and a range of said second region.

3. A three-dimensional visual sensor according to claim 1, wherein said reference information includes information on a positional relation between said first and second regions and a range of said second region.

4. A three-dimensional visual sensor according claim 1, wherein the two-dimensional image from which the information on said first region is obtained is a two-dimensional image captured without projecting the reference beam, and the two-dimensional image from which the information on said second region is obtained is a two-dimensional image captured by projecting the reference beam.

5. A three-dimensional visual sensor according to claim 1, wherein the two-dimensional image from which the information on said first and second regions is obtained is a two-dimensional image captured by projecting the reference beam.

6. A three-dimensional visual sensor according to claim 1, wherein said reference information includes information on a position, a size and an orientation of said first region, and a position and a range of said second region.

7. A three-dimensional visual sensor for obtaining three-dimensional information on an objective workpiece based on an image of the objective workpiece captured by projecting a reference beam onto the objective workpiece, comprising:
   means for detecting a two-dimensional image of a reference workpiece of a same type as the objective workpiece:
   means for storing, as reference information, information on a surface of a first region including a characteristic part of the objective workpiece and a surface of a second region as a target region of three-dimensional measurement of the objective workpiece, said information on the first and second regions being obtained from the detected two-dimensional image of the reference workpiece of the same type as the objective workpiece, which is captured from a predetermined position;
   means for capturing an image of the objective workpiece and determining a region corresponding to said first region in the image of the objective workpiece;
   means for determining a region corresponding to said second region based on information on a position and an orientation of the region determined as corresponding to said first region and said reference information stored in said storage means; and
   means for obtaining three-dimensional information on the objective workpiece in the region determined as corresponding to said second region of an image of the objective workpiece captured by projecting said reference beam onto the objective workpiece.

8. A three-dimensional visual sensor according to claim 7, wherein said reference information includes information on a position and an orientation of said first region and a position and a range of said second region.

9. A three-dimensional visual sensor according to claim 7, wherein said reference information includes information on an orientation of said first region, a range of said second region, and a positional relation between said first and second regions.

10. A three-dimensional visual sensor according to claim 7, wherein the two-dimensional image from which the information on said first region is obtained is a two-dimensional image captured without projecting the reference beam, and the two-dimensional image from which the information on said second region is obtained is a two-dimensional image captured by projecting the reference beam.

11. A three-dimensional visual sensor according to claim 7, wherein the two-dimensional image from which the information on said first and second regions is obtained is a two-dimensional image captured by projecting the reference beam.

12. A three-dimensional visual sensor for obtaining three-dimensional information on an objective workpiece based on an image of the objective workpiece captured by projecting a reference beam onto the objective workpiece, comprising:
   means for detecting a two-dimensional image of a reference workpiece of a same type as the objective workpiece;

means for storing, as reference information, information about a surface of a first region including a characteristic part of the objective workpiece and a surface of a second region as a target region of three-dimensional measurement of the objective workpiece, said information about the first and second regions being obtained from the detected two-dimensional image of the reference workpiece of the same type as the objective workpiece, which is captured from a predetermined position;

means for capturing an image of the objective workpiece and determining a region corresponding to said first region in the image of the objective workpiece;

means for determining another region in the image of the objective workpiece corresponding to said second region based on information on a position and a size of the region determined as corresponding to said first region and said reference information stored in said storage means; and means for obtaining three-dimensional information on the objective workpiece in the another region.

13. A three-dimensional visual sensor according to claim 12, wherein said reference information includes information on a position and a size of said first region, and a position and a range of said second region.

14. A three dimensional visual sensor according to claim 12, wherein said reference information includes information on a size of said first region, a range of said second region, and a positional relation between said first and second regions.

15. A three-dimensional visual sensor according to claim 12, wherein the two-dimensional image from which the information on said first region is obtained is a two-dimensional image captured without projecting the reference beam, and the two-dimensional image from which the information on said second region is obtained is a two-dimensional image captured by projecting the reference beam.

16. A three-dimensional visual sensor according to claim 11, wherein the two-dimensional image from which the information on said first and second regions is obtained is a two-dimensional image captured by projecting the reference beam.

17. A three-dimensional visual sensor for obtaining three-dimensional information on an objective workpiece based on an image of the objective workpiece captured by projecting a reference beam onto the objective workpiece, comprising:

means for detecting a two-dimensional image of a reference work piece of a same type as the objective workpiece;

means for storing, as reference information, information on a surface of a first region including a characteristic part of the objective workpiece and a surface of a second region as a target region of three-dimensional measurement of the objective workpiece, said information on the first and second regions being obtained from the detected two-dimensional image of the reference workpiece of the same type as the objective workpiece, which is captured from a predetermined position;

means for capturing an image of the objective workpiece and determining a region corresponding to said first region in the image of the objective workpiece;

means for determining a region corresponding to said second region based on information on a position, an orientation and a size of the region determined as corresponding to said first region and said reference information stored in said storage means; and means for obtaining three-dimensional information on the objective workpiece in the region determined as corresponding to said second region of an image of the objective workpiece captured by projecting said reference beam onto the objective workpiece.

18. A three-dimensional visual sensor according to claim 17, wherein said reference information includes information on a size and an orientation of said first region, a range of said second region, and a positional relation between said first and second regions.

19. A three-dimensional visual sensor according to claim 17, wherein the two-dimensional image from which the information on said first region is obtained is a two-dimensional image captured without projecting the reference beam, and the two-dimensional image from which the information on said second region is obtained is a two-dimensional image captured by projecting the reference beam.

20. A three dimensional visual sensor according to claim 17, wherein the two-dimensional image from which the information on said first and second regions is obtained is a two-dimensional image captured by projecting the reference beam.

* * * * *

UNITED STATES PATENT AND TRADEMARK OFFICE
CERTIFICATE OF CORRECTION

| | |
|---|---|
| PATENT NO. | : 7,502,504 B2 |
| APPLICATION NO. | : 10/685498 |
| DATED | : March 10, 2009 |
| INVENTOR(S) | : Kazunori Ban et al. |

It is certified that error appears in the above-identified patent and that said Letters Patent is hereby corrected as shown below:

Column 6, Line 56, change "Sa'/Sa" to --S'a/Sa--.

Column 9, Line 34, change "about" to --on--.

Column 10, Line 29, change "a region" to --another region in the image of the objective workpiece--.

Column 10, Lines 35-38, change "region determined as corresponding to said second region of an image of the objective workpiece captured by projecting said reference beam onto the objective workpiece." to --another region.--.

Column 11, Line 2, change "about" to --on--.

Column 11, Line 5, change "about" to --on--.

Column 11, Line 25, change "three dimensional" to --three-dimensional--.

Column 11, Lines 36-37, change "claim 11," to --claim 12,--.

Column 12, Line 16, change "a region" to --another region in the image of the objective workpiece--.

Column 12, Lines 22-25, change "region determined as corresponding to said second region of an image of the objective workpiece captured by projecting said reference beam onto the objective workpiece." to --another region.--.

UNITED STATES PATENT AND TRADEMARK OFFICE
CERTIFICATE OF CORRECTION

PATENT NO. : 7,502,504 B2
APPLICATION NO. : 10/685498
DATED : March 10, 2009
INVENTOR(S) : Kazunori Ban et al.

It is certified that error appears in the above-identified patent and that said Letters Patent is hereby corrected as shown below:

Column 12, Line 38, change "three dimensional" to --three-dimensional--.

Signed and Sealed this

Eighth Day of September, 2009

David J. Kappos
*Director of the United States Patent and Trademark Office*